ical Patent [19] [11] 4,285,845
Russell [45] Aug. 25, 1981

[54] UNSATURATED POLYESTER RESINS

[75] Inventor: Robert F. Russell, Wellingborough, England

[73] Assignee: Scott Bader Company Limited, Wellingborough, England

[21] Appl. No.: 63,134

[22] Filed: Aug. 3, 1979

[30] Foreign Application Priority Data

Aug. 8, 1978 [GB] United Kingdom ............... 32554/78
Feb. 1, 1979 [GB] United Kingdom ................. 3499/79

[51] Int. Cl.$^3$ ..................... C08L 67/06; C08L 91/08
[52] U.S. Cl. .................................. 260/28 R; 525/11; 525/39; 525/48
[58] Field of Search ................ 525/39, 48, 11; 260/28

[56] References Cited

U.S. PATENT DOCUMENTS

| 3,042,651 | 7/1962 | Martens | 525/39 X |
| 3,188,363 | 6/1965 | Amidon et al. | 525/39 X |
| 3,507,933 | 4/1970 | Larsen et al. | 525/48 X |
| 3,760,033 | 9/1973 | Arbuckle et al. | 525/48 X |
| 3,983,185 | 9/1976 | Dorfman et al. | 525/48 X |
| 4,041,008 | 8/1977 | Makhlouf et al. | 525/39 X |

*Primary Examiner*—Allan Lieberman
*Attorney, Agent, or Firm*—Pearne, Gordon, Sessions, McCoy & Granger

[57] ABSTRACT

To allow the use of stearyl stearate or paraffin in amounts to restrict styrene evaporation from an unsaturated polyester resin during curing, there is present in the resin a small amount (0.1 to 5% by weight) of a long-chain vinyl compound of the formula

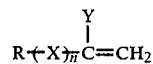

wherein
R is straight- or branched-chain substituted or unsubstituted aliphatic $C_6$–$C_{24}$ hydrocarbon,
Y=H or $CH_3$,
n=zero or 1,

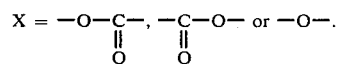

Preferred such compounds are lauryl and stearyl methacrylate.

The resins are made by admixture of the selected compound(s) with the conventional other components of the resin.

10 Claims, No Drawings

UNSATURATED POLYESTER RESINS

BACKGROUND OF THE INVENTION

1. Field of the Invention

The invention relates to unsaturated polyester resins, to methods of making them, and in particular to the inhibition of evaporation of styrene monomer therefrom.

2. Description of the Prior Art

It has been known for many years that the inclusion of small quantities of paraffin wax in polyester resins prevents air inhibition of the open surface of mouldings on cure (British Pat. No. 713,332). The wax works by migration to the open surface forming a thin layer which prevents air from interfering with the surface cure. The quantity needed depends on the melting point of the wax used, commonly a paraffin, although other waxy materials have been claimed, e.g. stearyl stearate (British Pat. No. 850,762). In practice about 100 ppm. of a paraffin wax mp 52°–54° C. has been employed.

More recently a need has arisen on environmental grounds to reduce the evaporation of styrene monomer from the surface of a laminate in the interval between lay-up and cure. This can be achieved by the incorporation of higher levels of paraffin wax, and the effect of different levels of wax on the styrene loss is progressively greater as the levels of paraffin wax increase up to about 800 ppm. for most types of resin, although some types will require even more wax.

However, at the higher levels of wax required to substantially reduce styrene evaporation several drawbacks have been noted:

(i) the wax can separate from the liquid resin when it is stored at low temperatures, (ii) the layer of wax can interfere with the adhesion between one layer of laminate and the next, especially where there is a delay between lay up and cure.

Several method of overcoming these disadvantages have been proposed i.e. the incorporation of small quantities of a straight chain hydrocarbon, e.g. n-octane or the use of a surfactant such as polyoxyethylene sorbitan fatty acid esters (German Offenlegungsschrift No. 2554930).

Neither of these methods has been particularly successful. For example 2% n-octane lowers the heat deflection temperature of the cured resin and imparts a milky appearance to the laminate.

SUMMARY OF THE INVENTION

The present invention faces the task of allowing efficient inhibition of styrene evaporation by adding the larger quantities of paraffin wax or other ingredient which are needed in comparison to the quantities which would have been needed merely for the prevention of air inhibition (air inhibition is an effect of the atmosphere on the surface layer of the laminate so that it does not cure properly), without however, involving the penalty of loss of adhesion or spoiled appearance. Furthermore, the present invention will permit the preservation of the desired heat deflection temperature in the cured resin.

In the invention therefore we admix with the conventional components of an unsaturated polyester resin composition (which conventionally consists of a prepolymer plus styrene as a vehicle and cross-linking agent and an accelerator, to which is then added a catalyst when curing is desired), an unsaturated compound which is theoretically capable of taking part in the cross-linking reaction.

These compounds are of the formula

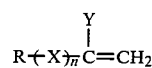

wherein $Y = H$ or $CH_3$, $R =$ a straight- or branched-chain substituted or unsubstituted, aliphatic $C_{6-24}$ hydrocarbon, $n =$ zero or 1 and

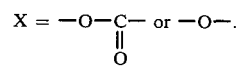

and includes both vinyl and acrylic esters, i.e. esters where

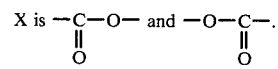

There has been a disclosure in U.K. Pat. No. 862583 of the modification of an alkyd resin by the incorporation into it of styrene and a methacrylate, including 2-ethylhexyl methacrylate and n-octyl methacrylate. Of course, this is quite different from a polyester resin composition of the type we are concerned with here since in that case both modifiers are incorporated into the monomer component and are not active in the curing stage, which occurs through the unsaturated oil components of the alkyd. The problem of styrene evaporation does not, of course, arise in that composition at all since the styrene is chemically bound into one ingredient of the total composition.

The invention includes the use of those compounds where, by the nature of the alcohols containing the group R from which esters or ethers are prepared, the groups R have a mixture of chain lengths, and although normally only one such compound will be used in a composition, there is no exclusion of the use of a plurality of such compounds.

Examples of branched chain hydrocarbons R are 2-ethylhexyl, tridecane and iso octadecane and examples of substituents are alkyl, aryl, carboxyalkyl, hydroxyl, alkoxy, and aroyl groups and halogen atoms (though iodine and bromine would not be desirable substituents—and nor would an amino group).

The styrene used as a vehicle will, in a commercial situation, be styrene itself, but in principle, substituted styrenes may be used.

A preferred hydrocarbon of the group R is a $C_{6-18}$ or even $C_{2-24}$ hydrocarbon, $C_{8-22}$, especially $C_{8-18}$, hydrocarbons being more preferred. The hydrocarbon should be saturated.

Particularly preferred compounds are those in which R is a straight-chain unsubstituted hydrocarbon, especially with 12 or 18 carbon atoms, namely lauryl or stearyl and those where n is 1,

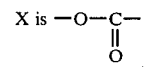

and y is methyl, namely lauryl and stearyl methacrylates.

Typical examples of suitable compounds are n-octadecene, lauryl methacrylate, vinyl stearate and vinyl stearyl ether.

Amounts of 0.1–5% by weight of the said compound can be used, but the preferred range is 0.5–2.5%.

These amounts of component allow the use of quantities of paraffin wax and/or similar ingredient much larger than those which would have been needed merely for the prevention of air inhibition and yet such large amounts can be incorporated in the composition without any of the previously mentioned disadvantages associated with these known ingredients.

Preferred embodiments of the invention will now be described in more detail with reference to the following Examples, which illustrate the excellence of such embodiments.

DESCRIPTION OF PREFERRED EMBODIMENTS

EXAMPLE 1

To 1 kg of CRYSTIC ®406PA (an orthophthalic acid based pre-accelerated general purpose polyester) there was added 0.75 g paraffin wax m.p. 52°–54° C. and 20 g lauryl methacrylate, 500 kg of this mixture was mixed with 10 g methyl ethyl keton peroxide (Butanox $^R$M50) and this was used to make a glass fibre laminate 0.5 sq.m. in area using one layer of 450 g/sq.m. glass matt. After 24 hours the other half of the resin was catalysed and a further layer of glass mat laminated onto the first.

After a further period of 24 hours a laminate of good clarity was tested for interlaminar adhesion and it was very difficult to separate the two layers.

The heat deflection of a cast of the resin mix (when determined according to B.S.2782 Method 121A) was 62° C.

EXAMPLE 2

The procedure of Example 1 was followed except that the lauryl methacrylate was omitted. The final laminate had poor interlaminar adhesion and could be easily peeled apart.

The heat deflection temperature of a cast of the resin mix was 62° C.

EXAMPLE 3

The procedure of Example 1 was followed, except that the lauryl methacrylate was replaced by an equal weight of n-octane. The final laminate had a milky appearance, and whilst the interlaminar adhesion was better than the laminate of Example 2 it was inferior to that of Example 1.

The heat deflection temperature of a cast of the resin mix was 54° C., i.e. it had been depressed by the n-octane present.

EXAMPLE 4

To 1 kg. of Crystic ® 406 PA (an orthophthalic acid-based pre-accelerated general purpose polyester) there was added 1.00 g paraffin wax mp. 52°–54° C. and 10.0 g stearyl methacrylate. A laminate made up as described in Example 1 had a styrene evaporation rate of 3 g/m$^2$ in 10 minutes and 4 g/m$^2$ in 30 minutes. Excellent adhesion between successive laminations was obtained.

EXAMPLE 5

To 1 kg. of Crystic ®491 PA (an isophthalic acid based resin) there was added 1.0 g paraffin wax mp 52°–54° C. and 1.25 g stearyl methacrylate. Laminates from this formulation had a styrene evaporation rae of 7 g/m$^2$ in 1 10 minutes and 9 g/m$^2$ in 30 minutes. Excellent interlaminar adhesion was obtained under all conditions.

EXAMPLE 6

To 1 kg of Crystic ® 406 PA there was added 0.75 g paraffin wax mp 52°–54° C. and 20 g vinyl decanoate. A laminate made up as described in Example 1 had a sytrene evaporation rate of 1 g/m$^2$ in 10 minutes and 2 g/m$^2$ in 30 minutes. Excellent adhesion between successive laminations was obtained.

EXAMPLE 7

The same composition as used in Example 6 was made except that the vinyl decanoate was replaced by 20 g dec-1-ene. The styrene evaporation rate after 10 minutes was 8 g/m$^2$ and after 30 minutes 12 g/m$^2$. Again excellent adhesion between successive laminations was obtained.

EXAMPLE 8

The same composition as used in Example 6 was made except that the vinyl decanoate was replaced by 20 g lauryl vinyl ether. The styrene evaporation rate after 10 minutes was 12 g/m$^2$ and after 30 minutes 29 g/m$^2$. No loss of adhesion between successive laminations was noted.

EXAMPLE 9

The same composition as Example 6 was made except that the vinyl decanoate was replaced by 7-5 g $C_{22}$–$C_{24}$ alkyl methacrylate. The styrene evaporation rate was 2 g/m$^2$ after 10 minutes and 3 g/m$^2$ after 30 minutes. Very good interlaminar adhesion was obtained.

I claim:

1. An unsaturated polyester resin composition for ambient temperature open lay-up moulding containing styrene as an agent for cross-linking during curing, a waxy compound selected from the group consisting of stearyl stearate and paraffin, and 0.1 to 5% by weight of at least one compound which is present to allow said waxy compound to be present in amounts which restrict styrene evaporation, which compound is theoretically capable of taking part in the cross-linking reaction and is of the formula

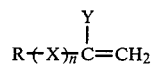

wherein

Y is selected from the group consisting of hydrogen and methyl,

R is selected from the group consisting of straight and branched-chain and unsubstituted and, substituted aliphatic $C_6$–$C_{24}$ hydrocarbons, n is a value selected from zero and 1 and X is selected from the group consisting of $$-\text{O}-\overset{\underset{\|}{\text{O}}}{\text{C}}-, \quad -\overset{\underset{\|}{\text{O}}}{\text{C}}-\text{O}- \quad \text{and} \quad -\text{O}-.$$

2. An unsaturated polyester resin composition according to claim 1, wherein R is a $C_6$–$C_{18}$ hydrocarbon.

3. An unsaturated polyester resin composition according to claim 1, wherein R is a $C_{18}$–$C_{22}$ hydrocarbon.

4. An unsaturated polyester resin composition according to claim 2, wherein X is $$-\text{O}-\overset{\underset{\|}{\text{O}}}{\text{C}}-,$$

n is 1 and R is selected from the group consisting of $C_8$, $C_{12}$ and $C_{18}$ straight-chain unsubstituted saturated hydrocarbons.

5. An unsaturated polyester resin composition according to claim 1, wherein the compound is a member of the group consisting of lauryl methacrylate and stearyl methacrylate.

6. An unsaturated polyester resin composition according to claim 1, wherein the compound is present in an amount of 0.5 to 2.5% by weight of the composition.

7. An unsaturated polyester resin composition according to claim 5, wherein the compound is present in an amount of 0.5 to 2.5% by weight of the composition.

8. In an unsaturated polyester resin composition for ambient temperature open lay-up moulding containing styrene as an agent for cross-linking during curing and a waxy compound selected from the group consisting of stearyl stearate and paraffin, the improvement comprising 0.1 to 5% by weight of at least one additive compound which is present to allow said waxy compound to be present in amounts which restrict the evaporation of styrene during curing, the compound being of the formula $$R\text{+}X\text{)}_n\overset{\underset{|}{Y}}{C}=CH_2$$

wherein
Y is selected from the group consisting of hydrogen and methyl,
R is selected from the group consisting of straight and branched-chain and, unsubstituted and substituted aliphatic $C_6$–$C_{24}$ hydrocarbons,
n is a value selected from zero and 1 and
X is selected from the group consisting of $$-\text{O}-\overset{\underset{\|}{\text{O}}}{\text{C}}-, \quad -\overset{\underset{\|}{\text{O}}}{\text{C}}-\text{O}- \quad \text{and} \quad -\text{O}-.$$

9. The improvement as claimed in claim 8 wherein the compound is stearyl methacrylate.

10. The improvement as claimed in claim 8 or claim 9 wherein the compound is present in an amount of 0.5 to 2.5% by weight.

* * * * *

UNITED STATES PATENT AND TRADEMARK OFFICE
CERTIFICATE OF CORRECTION

PATENT NO. : 4,285,845

DATED : August 25, 1981

INVENTOR(S) : Robert F. Russell

It is certified that error appears in the above—identified patent and that said Letters Patent is hereby corrected as shown below:

Column 2, line 56, change "$C_{2-24}$" to --$C_{6-24}$--;

Column 4, line 6, change "rae" to --rate--;

line 7, delete "1";

line 65, delete "and" first occurrence;

line 65, after "chain" insert --,--;

line 65, after "and" second occurrence delete ",";

Column 6, line 18, delete "and" first occurrence.

Signed and Sealed this

Seventeenth Day of November 1981

[SEAL]

Attest:

GERALD J. MOSSINGHOFF

Attesting Officer     Commissioner of Patents and Trademarks